United States Patent
Osuna et al.

(10) Patent No.: US 6,210,520 B1
(45) Date of Patent: Apr. 3, 2001

(54) SCREEN PRINTABLE THERMALLY CURING CONDUCTIVE GEL

(75) Inventors: Jesus E. Osuna, National City, CA (US); Keith M. Mason, Ocean City, MD (US); Vernon E. Stygar, San Diego, CA (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/399,546

(22) Filed: Sep. 22, 1999

Related U.S. Application Data

(62) Division of application No. 08/884,829, filed on Jun. 30, 1997, now Pat. No. 6,020,424.

(51) Int. Cl.$^7$ .............................. C09J 9/00; B05D 3/02; H01L 23/36
(52) U.S. Cl. ................ 156/306.3; 257/717; 427/387; 427/419.7; 524/401; 524/404; 524/428; 524/495; 524/701; 524/786; 524/787; 524/796; 524/847
(58) Field of Search ................ 156/306.3; 257/717; 427/387, 419.7; 524/401, 404, 428, 495, 701, 786, 787, 796, 847

(56) References Cited

U.S. PATENT DOCUMENTS

| | | | |
|---|---|---|---|
| 5,051,275 | * 9/1991 | Wong | 427/58 |
| 5,822,675 | * 10/1998 | Paquet et al. | 428/561 |
| 5,968,606 | * 10/1999 | Osuna et al. | 427/510 |

* cited by examiner

*Primary Examiner*—Robert Dawson
*Assistant Examiner*—Jeffrey B. Robertson
(74) *Attorney, Agent, or Firm*—Rankin, Hill, Porter & Clark LLP

(57) ABSTRACT

The present invention provides a novel screen printable thermosetting composition for forming thermally conductive interface and a method of using the same. The composition is used to promote the transfer of heat from a source of heat such as an electronic device to a heat dissipation device such as a heat sink. The composition comprises by weight from about 35% to about 75% of a thermal curing vinyl terminated siloxane material, from about 0.005% to about 5% catalyst, from about 10% to about 30% hydrocarbon solvent and from about 20% to about 70% conductive filler.

7 Claims, No Drawings

SCREEN PRINTABLE THERMALLY CURING CONDUCTIVE GEL

RELATED APPLICATIONS

This application is a divisional application of application Ser. No. 08/884,829 filed Jun. 30, 1997, now U.S. Pat. No. 6,020,424, and entitled the same.

FIELD OF THE INVENTION

This invention concerns an electronic material composition for use in connection with heat generating electronic devices. More particularly, this invention concerns a new coating material containing thermally conductive particles such as boron nitride for use in forming an improved thermally conductive layer, and its method of application to a heat dissipation device for the purpose of transferring waste heat from an electronic heat generating source.

PRIOR ART

In the field of microprocessors and other types of electronic heat generating sources, it is well-known to use a thermally conducting organic interface material, filled with thermally conductive fillers or powders, as a heat transfer medium between a heat sink and the heat generating source. In particular, polysiloxane oils or polysiloxane elastomeric rubbers and thermoplastic materials such as PVC, polypropylene, etc. loaded with thermally conducting ceramics or other fillers such as aluminum nitride, boron nitride, diamond or zinc oxide have been used to impart thermally conducting properties to the organic phase.

In the case of polysiloxane oils loaded with thermally conducting materials, these materials are applied by smearing the heat sink or other electronic component with the thermally conducting paste and then securing the heat sink in place by mechanical means using clips or screws. In the case of polysiloxane rubbers and thermoplastic polymers, these materials are typically cast in sheet form and die cut into shapes corresponding to the shape of the heat sink and heat generating device. The resulting preform is then applied to the surface of the heat generating surface securing the heat sink by means of clips or screws.

Thermal greases are also used to conduct heat in electronic devices. The prior art thermal greases show superior film forming and gap filling characteristics between uneven surfaces thus providing an intimate contact between the surface of the h eat sink and the surface of the heat generating source. However, it has been found that the use of thermal greases exhibit poor adhesions to the surfaces of the heat sink and heat generating surface, thus effectively seeping out from between the heat sink and the heat generating surface, causing air voids to form between the two surfaces leading to hot spots. Moreover, excessive pressure placed upon the heat sink by the mechanical fasteners accelerates this seepage from between the heat sink and the surface of the heat generating surface. It has been reported that excessive squeeze out of polysiloxane oils can evaporate and recondense on sensitive parts of the surrounding microcircuits. The recondensed oils lead to the formation of silicates thereby interfering with the function of the microprocessor and eventually causing failure.

The precut films solve the problems associated with greases but do not provide adequate intimate contact required for optimum heat transference between the heat generating source and the heat sink. Typical precut films do not show the film forming capacity as do the thermal greases. The added step of cutting preforms and manually applying the pad, adds cost to the assembly process. Furthermore, these types of materials show variable performance due to variation in the thickness of the pad and the amount of pressure applied to the thermally conducting precut film, based upon the mechanical device or action used to secure the heat sink.

SUMMARY OF THE INVENTION

The present invention provides a new and improved composition for forming a thermally conducting polymeric interface layer or film for use in electronic applications, and a method of using such material. A suspension of thermally conducting filler is used to impart thermal conduction properties to the screen printable coating material system or gel. When cured, the resultant thermally conducting thermal film, being highly compressive, forms an intimate contact between the heat source and the heat sink. The material composition includes one or more thermally curable or heat curable organic materials that upon curing form a highly compressible elastomeric gel. Since this material is a thermoset, no squeeze out of the material can occur subsequent to curing.

After the material composition is prepared, it is then screen printed onto the surface of a heat sink or other electronic component and then cured. The resultant film formed upon the heat sink or other device can be controlled to close tolerances, thereby imparting a consistent thickness and thereby allowing the uniform transfer of heat. The cured film being slightly compressive facilitates the touching of the particles of the thermally conductive filler. Typical prior art preform films do not have good compressibility, which results in poor intimate contact between the surface of the heat sink and the heat generating source. Because of the screenable nature of this material, variable die sizes can be quickly made up when using the thermal interface material of the present invention. The film formed by the material composition of the present invention is substantially non-corrosive and it will not creep or bleed-out under applied pressure.

An example of an application for which the composition of the present invention may be employed may be found in U.S. Pat. No. 5,313,099. The '099 reference, which is incorporated herein by reference, discloses a heat dissipating device such as a heat sink for use in connection with solid-state devices. The composition of the present invention would be utilized on the contact surfaces between the heat sink and the solid-state device in order to ensure the flow of heat from the device to the heat sink. In such an application the cured composition is sandwiched between the heat generating device and the heat dissipating device and such cured composition serves to facilitate the transfer of heat between the devices.

In a preferred embodiment the thermally curable composition comprises by weight from about 35% to about 75% of a heat curable vinyl terminated siloxane material, from about 0.005% to about 5% catalyst, from about 10% to about 30% hydrocarbon solvent and from about 20% to about 70% conductive filler. In order to be screen printable, the composition displays a viscosity of from about 5,000 to about 50,000 centipoise at 25° C. using a 1 RPM HBT (CP51). Also, upon curing the composition displays a modulus of from about 500 to about 250,000 at 25° C. and a thermal conductivity of at least 1.5 (W/m° K).

These and other aspects of the present invention will become clear to those skilled in the art upon the reading and understanding of the specification and the claims below.

DETAILED DESCRIPTION

The thermally conductive gel of the present invention comprises a thermally curable (thermosetting) vinyl terminated siloxane resin material, a catalyst, a thermally conductive filler and a hydrocarbon solvent.

The material composition also contains a hydrocarbon solvent. In addition to facilitating the screen printing of the composition, the solvent serves to facilitate the complete wetting of the conductive fillers. The solvent also allows high loading of the fillers in the composition. High loading of the fillers provides superior heat transfer properties as well as superior physical properties. Examples of suitable hydrocarbon solvents include, for example, an aromatic hydrocarbon solvent sold under the trade designation Aromatic 100 by Union Carbide of Danbury, Conn. Another suitable hydrocarbon solvent includes the ISOPAR series of solvents available from Exxon Chemical of Houston, Tex.

Examples of thermally conductive fillers suitable for use in the present invention include fine particles of boron nitride, aluminum nitride and diamond. Mixtures of such materials may also be utilized. The particle size of the fillers is important. The fillers display an average particle size of less than 40 microns. Preferably, the filler displays a bimodal distribution to enhance packing efficiency. Specifically, preferably, about 30% by volume of the particles display an average particle size of about 31 microns, and about another 30% by volume of the particles display an average particle size of about 12 microns. An example of a conductive filler suitable for use with the present invention is a boron nitride material sold under the trade designation Polartherm PT620 by Advanced Ceramics of Cleveland, Ohio.

It will be appreciated that the particular conductive filler that is utilized is generally a function of the particular application for the conductive composition including for example, the amount of heat that must be transferred from the heat generating electronic device.

The material composition also includes one or more catalysts or initiators. Examples of suitable catalysts include metal catalysts such as tin octoate, platinum and hexachloroplatinum.

A material system comprising the vinyl terminated siloxane and a catalyst may also be employed. An example of such a system is a vinyl terminated siloxane curable resin system sold under the trade designation 1840 by Shin-Etsu Silicones of America, Inc. of Akron, Ohio.

Reaction (crosslinking) of the vinyl terminated siloxane material is initiated upon exposure to a heat source. Initiation of the free radical polymerization occurs upon absorption of heat by the catalysts or initiators. The catalyst or initiators help to perpetuate the crosslinking reaction of the vinyl terminated siloxane resin material. The curing parameter of the composition depends on factors such as applied thickness, environmental conditions and energy levels of the heat source. However, the composition generally cures in less than 45 minutes when exposed to a heat source of 150° C.

Prior to curing, in order to ensure that the conductive material composition is screen printable, it preferably displays a viscosity of from about 5,000 to about 50,000 centipoise at 25° C. using a IRPM HBT (CP51). The composition is capable of being applied at a thickness of from about 0.001" to about 0.005" with a tolerance of about 0.0005". After curing, the composition preferably displays a modulus of from about 500 to about 250,000 at 25° C. After curing, the composition also displays a thermal conductivity of at least 1.5 (W/m° K) and a coefficient of thermal expansion of less than 40 ppm between −55° C. to 150° C. After curing, the cured film also displays a volume resistivity of at least $0.5 \times 10^{15}$ Ohm·cm. It will be appreciated that the composition can be easily rendered electrically conductive by adding conductive metals such as silver or gold. In certain applications it may be advantageous to have an electrically conductive composition.

The material composition is easily prepared by mixing the various components in a conventional mixing device such as a Hobart mixer. During mixing, preferably any hydrocarbon solvent lost due to evaporation is replaced.

The following examples are intended only to illustrate the invention and should not be construed as imposing limitations upon the claims.

EXAMPLE I

The following screen printable composition was prepared using a Hobart mixer at low speed for about 20 minutes. During mixing, any hydrocarbon solvent lost due to evaporation was replaced.

| Component | % Weight |
| --- | --- |
| Shin-Etsu 1840 Curable Resin System | 41.61 |
| Isopar G Hydrocarbon Solvent | 18.91 |
| Isopar K Hydrocarbon Solvent | 18.91 |
| Boron Nitride Advanced Ceramics PT620 | 19.57 |
| Black Pigment | 1.00 |

The composition displayed a viscosity of about 15,000 centipoise at 25° C. using a 1 RPM HBT (CP51).

EXAMPLE II

The composition of Example 1 was applied to a metal substrate at a thickness of about 2 mils and cured in about 30 minutes by exposing the composition to 150° C. temperature. The cured film displayed the following properties.

| Property | |
| --- | --- |
| Modulus at 25° C. | 1000 |
| Weight loss at 300° C. <1% | |
| Volume resistivity | $10^{15}$ Ohm · cm |
| Thermal conductivity over 1.5 (W/m° K.) | |

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed is:

1. A method of forming a thermally conductive film upon a substrate, said film having a thermal conductivity of at least about 1.5 (W/m° K) and a modulus of from about 500 to about 250,000 at 25° C. comprising the steps of:

(I) providing a composition comprising by weight from about 35% to about 75% of a thermally curable vinyl terminated siloxane resin, from about 0.005% to about 5% catalyst, from about 10% to about 30% hydrocarbon solvent and from about 20% to about 70% conductive filler, said composition having a viscosity of from about 5,000 to about 50,000 centipoise at 25° C.;

(ii) screen printing said composition upon a substrate to form a layer having a thickness of from about 0.001" to about 0.005"; and (iii) subjecting said layer to a source of heat in order to cure said composition and form a conductive film layer having a thermal conductivity of at least 1.5 (W/m° K) and a modulus of at least about 500 at 25° C.

2. A method as set forth in claim 1 wherein said substrate comprises a device selected from the group consisting of a heat generating electronic device or a heat dissipating device.

3. A method as set forth in claim 2 wherein said heat dissipating device comprises a heat sink.

4. A method as set forth in claim 1 including the step of sandwiching the cured layer between a heat generating electronic device and a heat dissipating device.

5. A method as set forth in claim 1 wherein said conductive filler comprises a material selected from the group consisting of boron nitride, aluminum nitride, diamond and mixtures thereof.

6. A method as set forth in claim 1 wherein said filler displays a bimodal particle distribution.

7. A method as set forth in claim 1 wherein said filler includes an average particle size of less than about 40 microns.

\* \* \* \* \*